July 9, 1968

W. J. RICHARDSON ET AL 3,391,701

AUTOMATIC CAR WASHING ASSEMBLY

Filed Aug. 18, 1966

INVENTORS
William J. Richardson
Marvin L. Zabel

BY Hovey, Schmidt, Johnson & Hovey
ATTORNEYS

United States Patent Office 3,391,701
Patented July 9, 1968

3,391,701
AUTOMATIC CAR WASHING ASSEMBLY
William J. Richardson, 9121 Dearborn 66207, and Marvin L. Zabel, 6810 Glenwood 66204, both of Overland Park, Kans.
Filed Aug. 18, 1966, Ser. No. 573,263
9 Claims. (Cl. 134—123)

This invention relates to car washing equipment and, more particularly, to means for quickly and automatically cleaning the exposed surface of a car.

Drive-in car wash establishments have become very popular and originally involved do-it-yourself equipment which sprayed soap and water through a brush or the like for a limited time determined by a coin-operated mechanism. More recently, automatic means, which moves relative to the car such as by encircling the car on a track, has been utilized for spraying soap and water at high pressure against the car for cleaning the same. However, these automatic devices have not generally been capable of adequately cleaning all cars with any degree of uniformity. This may be attributed to economic considerations which require that the assembly accomplish the washing operation quickly to minimize use of soap and water and, additionally, to permit washing of a large number of vehicles during a day's operation.

Hence, it is the primary object of our invention to provide an automatic car washing assembly wherein improved structure is utilized to efficiently remove dirt and the like from the outer surface of a car by imparting a novel oscillatory spraying action to water being discharged at high pressure against the car.

Another important object of this invention is to provide a car washing assembly wherein multiple spray units are novelly arranged to effect a shearing spray action against the surface of the car, which spray action is highly effective in loosening hardened dirt and rinsing the car surface clean. More specifically, a plurality of spray nozzles are disposed in closely spaced pairs and shifted relative to each other to impart the aforesaid shearing action.

Another object of the instant invention is to provide monorail track means for smooth advancement of the spraying structure about the car, the track means being constructed to assure prolonged maintenance-free operation of the assembly.

Other objects include details of construction which will become apparent from the following specification and accompanying drawings, wherein.

Figure 1:
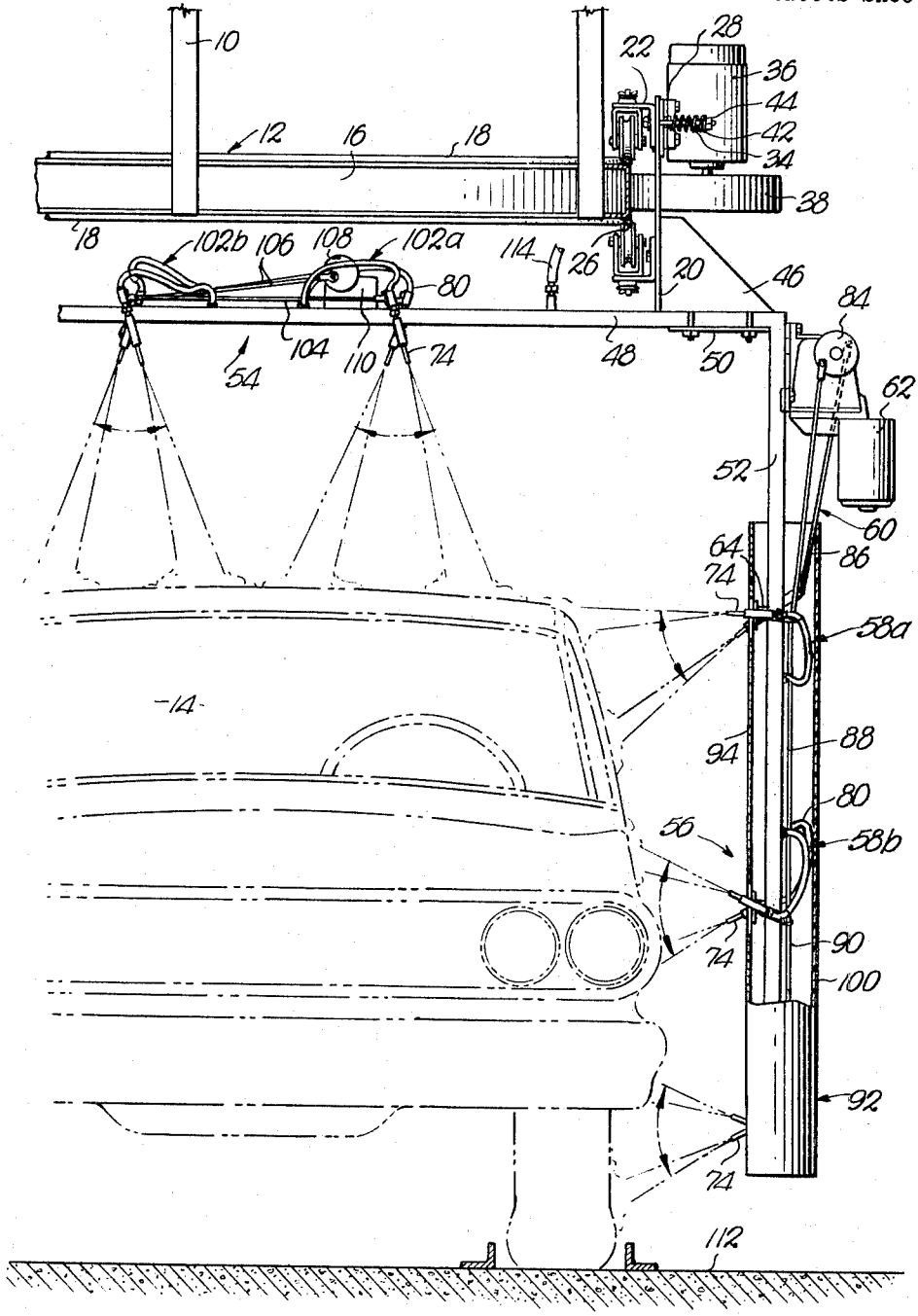
FIGURE 1 is a fragmentary, front elevational view of a car washing assembly made pursuant to the teachings of our invention, showing the same in operation, parts being broken away and in section for clarity.
Figure 2:
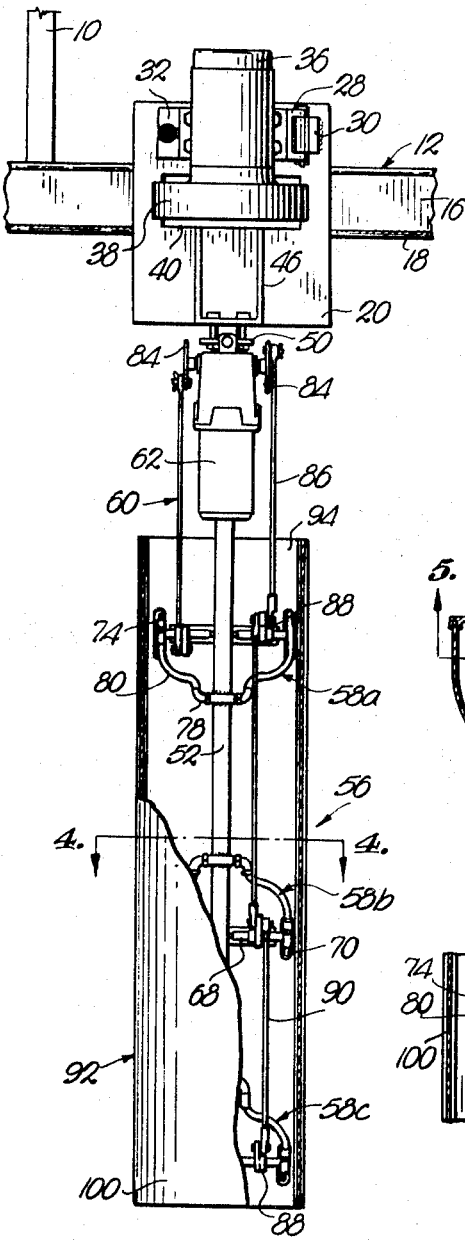
FIG. 2 is a side elevational view thereof, parts being broken away and in section to reveal details of construction.
Figure 3:
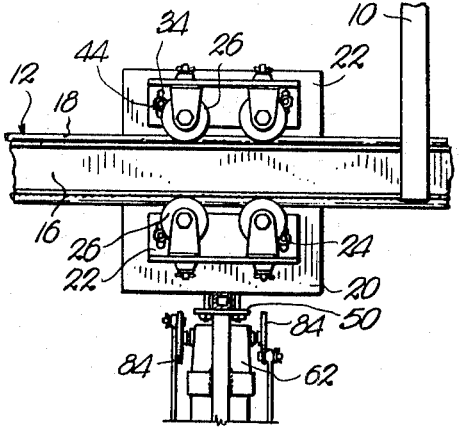
FIG. 3 is a fragmentary, side elevational view illustrating the opposite side of the assembly shown in FIG. 2.

In the illustrated form of the invention, the car washing equipment is carried by a plurality of support bars 10 which are suspended from the roof of the car washing establishment. A monorail track 12 is secured to support bars 10 and circumscribes a path approximately overlying the periphery of a vehicle, such as a car 14. Track 12 includes a peripheral channel 16 having upper and lower guide rods 18 secured thereto and coextensive therewith.

A plate member 20 carries upper and lower wheel frames 22 which are shiftably mounted on member 20 by bolt and slot means 24. Each wheel frame 22 rotatably carries a pair of grooved wheels 26 which are aligned for travel along corresponding guide rods 18. Attachment and removal of plate member 20 is effected by suitably shifting a wheel frame 22 toward or away from track 12. A swing plate 28 is pivotally secured to member 20 by a hinge 30, plate 28 presenting a fork 32 at its outer end adapted to interlock with a bolt 34 extending laterally from member 20. A prime mover in the form of a motor 36 is secured to swing plate 28 and rotatably drives a tire 38 which frictionally engages track 12 through an opening 40 formed in plate member 20. Tire 38 is yieldably biased against track 12 by a coil spring 42 interposed between fork 32 and a nut 44 threadably secured to the outer end of bolt 34.

A transversely U-shaped bracket 46 extends laterally from plate member 20 and carries a horizontal conduit or pipe 48 by means of a clamp 50. Pipe 48 is disposed above vehicle 14 and communicates with a second pipe 52 which extends vertically alongside vehicle 14, each pipe having corresponding nozzle banks 54 and 56.

Figure 4:
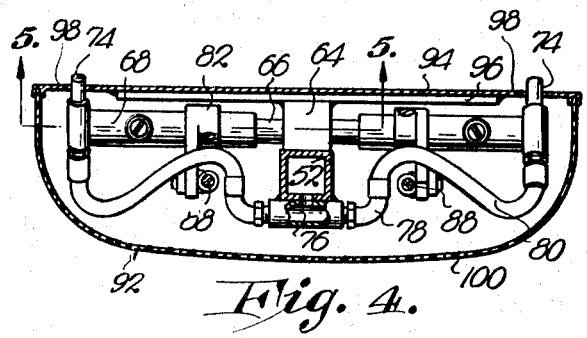
FIG. 4 is an enlarged, cross-sectional view taken along line 4—4 of FIG. 2.
Figure 5:
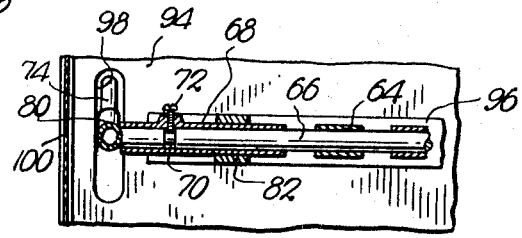
FIG. 5 is a cross-sectional view taken along line 5—5 of FIG. 4.

Vertical bank 56 includes three sprayer units 58a, 58b, and 58c which are aligned on pipe 52 and connected by linkage 60 a motor drive means 62 for synchronized spraying movement. Referring to FIGS. 4 and 5, each spray unit 58a, 58b and 58c includes a block 64 rigidly secured to pipe 52, the block 64 carrying a stationary shaft structure 66 which telescopically receives a pair of tube elements 68 at its corresponding ends. An annular groove 70 is formed adjacent each end of shaft 66 and receives the lower end of a screw 72 threaded through a respective tube 68 to preclude longitudinal shifting of the latter with respect to shaft 66 while permitting relative rotation therebetween. Each tube 68 is rigidly connected to a corresponding spray nozzle 74, the latter being in fluid communication with pipe 52 through a fitting 76, neck 78, and a suitable coupling such as a swivel fitting or, as shown in the drawing, a flexible hose 80.

Each tube 68 is provided with a corresponding lateral crank 82 secured for rotation therewith. Motor 62 rotates a pair of eccentric wheels 84 which are pivotally coupled by rods 86 to corresponding cranks 68 of upper unit 58a, whereby rotation of wheels 84 causes reciprocation of rods 86 to swing cranks 68 and thereby oscillate nozzles about the axis of corresponding tubes 68. Tubes 68 of upper unit 58a are pivotally connected to adjacent tubes 68 of center unit 58b by means of rods 88. Similarly, center unit 58b is connected to lower unit 58c by rods 90, whereby rotation of wheels 84 causes simultaneous oscillation of all nozzles on bank 56. Horizontal bank 54 includes a pair of spray units 102a and 102b which are identical to spray units 58a–58c and are coupled in the same manner by rods 104 and 106 for oscillatory movement upon rotation of eccentric wheels 108 by a motor 110.

A splash guard 92 is provided for vertical bank 56 and includes a planar, front portion 94 releasably secured to a plurality of braces 96 which are secured to corresponding blocks 64 and extend parallel to shafts 66. Front portion 94 of splash guard 92 has a plurality of elongated slots 98 formed therein for extension of nozzles 74 therethrough. A transversely U-shaped, rear portion 100 covers units 58a–58c and releasably interengages front portion 94 at the opposed ends of the latter. Similar splash guards may be provided for horizontal bank 54 and the monorail drive means.

In operation, car 14 is driven along the floor 112 of the car wash establishment until the car is aligned in underlying relationship with track 12. Suitable starting mechanism, such as coin-operated means, is actuated to start motors 36, 62 and 110 and to commence delivery of water from a pressurized source to supply hose 114 which communicates with pipe 48 for delivery of water therethrough and subsequently through pipe 52, fittings 76, necks 78, hoses 80, and nozzles 74. Motors 62 and 110 rotate respective eccentric wheels and thereby reciprocate corresponding rods to oscillate nozzles 74 as described above and shown in FIG. 1. Hoses 80 flex to compensate for the swinging of the nozzles during the cleaning operation.

Rods 86 are relatively offset 180° with respect to eccentric wheels 84 (FIG. 1) so that nozzles 74 of each unit 58a–58c swing in opposite directions during reciprocation of rods 86. The nozzles 74 of units 102a and 102b operate in an identical manner. The water emanating from nozzles 74 is delivered under high pressure and thus is discharged from each nozzle to impart a cleaning action over an elongated area on the surface of car 14 upon each oscillation thereof. The oscillatory motion of nozzle 74 creates an effective spraying action for cleaning the car, and the closely spaced nozzles of each individual unit cooperate by virtue of their opposed swinging paths to effect a novel shearing spraying action which loosens hardened dirt and the like which is on the surface of the car and efficiently rinses the same therefrom.

As the cleaning operation is being performed, motor 36 rotates tire 38 to cause continuous advancement of wheels 26 along rods 18 since tire 38 frictionally engages channel 16 of track 12. If necessary, the frictional engagement may be varied by adjusting nut 44 to change the biasing effect of spring 42. Advancement of wheels 26 causes corresponding advancement of nozzle banks 54 and 56 whereby the latter circumscribe a path about the periphery of car 14 for respectively cleaning the exposed top and side portions thereof. In practice, the spraying assembly may make a number of revolutions about car 14 with soap being injected into the water spray during the initial revolutions for washing the car, the soap injection being discontinued during the final revolutions so that the assembly will rinse the car.

Preferably, the lengths of the rods interconnecting the spray units are arranged so that the various spray patterns illustrated in FIG. 1 will not substantially intersect during swinging of nozzles 74 since such intersection would lower the pressure at which the water strikes the car. Thus, the various units clean particular sections of the car. In addition, nozzles 74 of the units may be set at relative horizontal angles so that, in the event the spraying arcs of adjacent units overlap, the central axis of the sprays will not be aligned and, therefore, the spraying pressure would not be substantially reduced. For example, nozzles 74 of upper unit 58a are angled forwardly of nozzles 74 of the adjacent unit 102a whereby, water from the rear nozzle of unit 58a is directed between the two sprays emanating from unit 102a, and the forward nozzle of unit 58a sprays forwardly of both nozzles of unit 102a. The nozzles of the other units may likewise be constructed to assure optimum spraying pressure.

Having thus described the invention, what is claimed as new and desired to be secured by Letters Patent is:

1. A vehicle washing assembly comprising:
   a support adapted to be disposed adjacent a vehicle;
   a plurality of nozzles spaced along the support;
   conduit means communicating with said nozzles and adapted for connection to a water supply for discharging water through the nozzles against the vehicle;
   structure pivotally mounting said nozzles on the support for swinging movement relative to the vehicle; and
   mechanism coupled to said nozzles for oscillating the same through corresponding arcs for spraying an elongated area on the surface of the vehicle, said nozzles being arranged in closely spaced pairs, said mechanism oscillating the nozzles of each pair relative to each other to effect a shearing spray action against the surface of the vehicle.

2. The invention of claim 1, said structure including a shaft for each pair of nozzles and a relatively rotatable element on each end of the shaft carrying a corresponding nozzle.

3. The invention of claim 2, wherein a plurality of said pairs are arranged to form a bank of aligned nozzles, said mechanism including linkage interconnecting the nozzles of said bank for synchronized movement thereof.

4. The invention of claim 3, said linkage including a crank on each element in said bank, there being a rod interconnecting adjacent cranks between said pairs and an eccentric wheel coupled to said rods, and drive means for rotating said wheel to reciprocate the rods for swinging said nozzles in said arcs.

5. The invention of claim 3, said conduit means including an elongated pipe extending longitudinally of said bank and carrying said shafts, said pipe being coupled to the water supply and having flexible hose means communicating with said nozzles to direct water therethrough.

6. The invention of claim 3, there being a pair of said banks, one being disposed horizontally above the vehicle, the other being disposed vertically alongside the vehicle.

7. The invention of claim 6, said support including a track shiftably carrying said banks for travel around the periphery of the vehicle, and prime mover means intercoupling said banks and said track for driving said banks along the rail.

8. The invention of claim 7, said track comprising a monorail having upper and lower wheel guides, there being wheels on the corresponding guides for rolling therealong, the wheels being interconnected by a member to interlock the wheels on the monorail, the member carrying said banks and having a rotatable tire thereon frictionally engaging said monorail, said prime mover means being coupled to the tire for rotating the same to advance said banks along the monorail.

9. A vehicle washing assembly comprising:
   a support adapted to be disposed adjacent a vehicle;
   a plurality of nozzles on the support;
   conduit means communicating with said nozzles and adapted for connection to a water supply for discharging water through the nozzles against the vehicle;
   structure shiftably mounting said nozzles on the support, the nozzles being arranged in closely spaced pairs; and
   mechanism coupled to said nozzles for shifting the nozzles of each pair relative to each other to effect a shearing spray action against the surface of the car.

References Cited

UNITED STATES PATENTS

| | | | |
|---|---|---|---|
| 2,328,448 | 8/1943 | Gustafsson et al. | 239—225 XR |
| 2,896,857 | 7/1959 | Tompkins | 134—123 XR |
| 3,009,469 | 11/1961 | Cunningham | 134—123 |
| 3,261,369 | 7/1966 | Thiele | 134—123 |
| 3,288,109 | 11/1966 | Smith et al. | 134—123 XR |

FOREIGN PATENTS 509,564  7/1939  Great Britain.

ROBERT L. BLEUTGE, *Primary Examiner.*